United States Patent
Nelson et al.

(10) Patent No.: US 8,920,717 B2
(45) Date of Patent: Dec. 30, 2014

(54) METHOD FOR REDUCING MICROORGANISMS ON PRODUCE USING CHLORINE DIOXIDE GAS

(75) Inventors: Philip E. Nelson, West Layfette, IN (US); Richard H. Linton, West Layfayette, IN (US); Yingchang Han, West Layfayette, IN (US); Travis L. Selby, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 382 days.

(21) Appl. No.: 12/459,759

(22) Filed: Jul. 7, 2009

(65) Prior Publication Data
US 2010/0075004 A1 Mar. 25, 2010

Related U.S. Application Data

(62) Division of application No. 10/993,133, filed on Nov. 19, 2004, now Pat. No. 7,571,676.

(51) Int. Cl.
*B65B 55/00* (2006.01)
*A23B 7/152* (2006.01)

(52) U.S. Cl.
CPC ..................................... *A23B 7/152* (2013.01)
USPC .......................................... 422/34; 426/318

(58) Field of Classification Search
CPC ....... A01N 1/0215; A01N 3/00; A01N 25/00; A23L 3/00; B05B 12/14
USPC ............................................ 422/37; 426/318
See application file for complete search history.

(56) References Cited

U.S. PATENT DOCUMENTS

| | | | |
|---|---|---|---|
| 4,504,442 A | 3/1985 | Rosenblatt et al. | 422/37 |
| 4,681,739 A | 7/1987 | Rosenblatt et al. | 422/37 |
| 4,908,188 A * | 3/1990 | Jefferis et al. | 422/111 |
| 5,043,175 A | 8/1991 | Bayley et al. | 426/318 |
| 5,290,524 A | 3/1994 | Rosenblatt et al. | 422/305 |
| 6,004,604 A * | 12/1999 | Thomas et al. | 426/326 |
| 6,033,704 A | 3/2000 | Talley | 426/320 |
| 6,235,240 B1 | 5/2001 | Heredia et al. | 422/30 |
| 6,291,003 B1 | 9/2001 | Riemann et al. | 426/511 |
| 6,605,253 B1 | 8/2003 | Perkins | 422/28 |
| 6,964,788 B2 | 11/2005 | Phebus et al. | 426/335 |
| 2003/0047087 A1* | 3/2003 | Phebus et al. | 99/516 |
| 2005/0079124 A1 | 4/2005 | Sanderson | 423/477 |
| 2005/0263015 A1 | 12/2005 | Mulgrew | 99/516 |
| 2010/0310418 A1* | 12/2010 | Mason et al. | 422/37 |

OTHER PUBLICATIONS

Han, et al., The effects of washing and chlorine dioxide gas on survival and attachment of *Escherichia coli* O157:H7 to green pepper surfaces, Food Microbiology, 17(5), 2000, pp. 521-533.

Du, et al., Efficacy of chlorine dioxide gas in reducing *Escherichia coli* O157:H7 on apple surfaces, Food Microbiology, 20, 2003, pp. 583-591.

(Continued)

*Primary Examiner* — Monzer R Chorbaji

(57) ABSTRACT

This invention provides a method for processing produce to reduce microorganisms thereon by treating the produce in a treatment chamber. The method comprises exposing the produce to an atmosphere comprising gaseous chlorine dioxide and a carrier gas in a treatment chamber and can comprise controlling the concentration of chlorine dioxide in the treatment chamber, moving the produce in the treatment chamber during exposure to the gaseous chlorine dioxide, spraying water to remove the gaseous chlorine dioxide, and purging the treatment chamber to remove any residual chlorine dioxide.

13 Claims, 5 Drawing Sheets

(56) References Cited

OTHER PUBLICATIONS

Du, et al., Inactivation of *Listeria monocytogenes* spotted onto different apple surfaces using chlorine dioxide gas, Food Microbiology, 19, 2002, pp. 481-490.

Tsai, et al., Prevention of potato spoilage during storage by chlorine dioxide, J. Food Sci., 66(3), 2001, pp. 427-477.

Han, et al., Reduction of *Listeria monocytogenes* on green peppers (*Capsicum annuum*) by gaseous and aqueous chlorine dioxide and water washing, and its growth at 7° C., J. Food Protection, 64, 2001, pp. 1730-1738.

Han, et al., Response surface modeling for the inactivation of *Escherichia coli* 0157:H7 on green peppers (*Capsicum annuum* L.) by chlorine dioxide pas treatments, J. Food Protection, 64, 2001, pp. 1128-1133.

Han, et al, Inactivation of *Escheriachia coli* 0157:H7 on surface-uninjured and -injured green pepper (*Capsicum annuum* L.) by chlorine dioxide gas as demonstrated by confocal laser scanning microscopy, Food Microbiology, 17(6), 2000, pp. 643-655.

Han, et al., Efficacy of chlorine dioxide gas as a sanitizer for tanks used for aseptic juice storage, Food Microbiology, 16, 1999, pp. 53-61.

Han, et al., Decontamination of Strawberries Using Batch and Continuous Chlorine Dioxide Gas Treatments, J. Food. Prot., 67(11), 2004, pp. 2450-2454.

Han, et al., Decontamination of *Bacillus thuringiensis* Spores on Selected Surfaces by Chlorine Dioxide Gas, J. Env, Health., 66(4), Nov. 2003, pp. 16-20.

Sy, et al., Evaluation of Gaseous Chlorine Dioxide as a Sanitizer for Killing *Salmonella, Escherichia coli* O157:H7, *Listeria monocytogenes*, and Yeasts and Molds on Fresh and Fresh-cut Produce, J. Food Prot., 68(6), 2005, pp. 1176-1187.

Sy, et al., Efficacy of Gaseous Chlorine Dioxide as a Sanitizer for Killing *Salmonella*, Yeasts, and Molds on Blueberries, Strawberries, and Raspberries, J. Food Prot., 68(6), 2005, pp. 1165-1175.

\* cited by examiner

METHOD FOR REDUCING MICROORGANISMS ON PRODUCE USING CHLORINE DIOXIDE GAS

This application is a divisional of Ser. No. 10/993,133 filed Nov. 19, 2004, now U.S. Pat. No. 7,571,676.

CONTRACTUAL ORIGIN OF THE INVENTION

This invention was made with Government support Grant/Contract No 00-51110-9749, awarded by the United States Department of Agriculture/Cooperative Sate Research, Washington, D.C. The Government may have certain rights in this invention.

BACKGROUND OF THE INVENTION

1. Field of the Invention

The present invention relates to an apparatus and method for processing produce and more particularly, to exposing produce to an atmosphere having an effective amount of chlorine dioxide gas in a treatment chamber to reduce microorganisms present on the produce.

2. Description of Related Art

Consumers are currently consuming more fresh produce for health and nutrition reasons, with a 27% increase in fresh produce consumption in the United States from 1970 to 1993. Most popular among consumers are minimally processed and refrigerated (MPR) fruits and vegetables that satisfy the need for convenience and longevity. However, fruits and vegetables can serve as vehicles for almost any foodborne pathogenic microorganism. The usual sources of pathogen contamination are from irrigation or wash water, fertilizers of animal waste and municipal biosolids, infected operators, and operation of facilities with poor sanitation. There have been numerous reports of foodborne outbreaks associated with contaminated foods. Outbreak and incidence of pathogens, such as enterotoxigenic *Escherichia coli* O157:H7, *Listeria monocytogenes*, *Salmonella* spp., *Shigella* spp., *Cyclospora*, and hepatitis A virus, have been attributed to consumption of lettuce, cantaloupe, celery, tomatoes, cabbage, alfalfa sprouts, mushrooms, cucumbers, potatoes, radishes, raspberries, onions, carrots, zucchini, peppers, broccoli, apple cider, and orange juice.

Washing with chlorinated water (50-200 ppm chlorine) is widely used to sanitize whole fruits and vegetables as well as fresh-cut produce on a commercial scale. However, its effectiveness is limited in reducing the population of microorganisms (less than 2 log colony forming unit, hereinafter CFU) on fruits and vegetables. Moreover, environmental and health organizations have expressed concerns with the by-products from chlorine reactions with organic materials, such as chloroform, carbon tetrachloride, chloromethane, and others, generally known as trihalomethanes (THMs) that have been implicated as carcinogens that can lead to kidney, bladder, and colon cancer. Food processors are concerned about the possibility of future regulatory constraints on the use of chlorine as a sanitizing agent. Furthermore, other aqueous sanitation treatments such as hydrogen peroxide, peroxyacetic acid, trisodium phosphate, ozone, chlorine dioxide, and other combinations have been reported, but are not that effective in reducing pathogens on produce surfaces (<3 log). Therefore, highly effective antimicrobial technologies that reduce pathogens on produce to a greater than 3-log reduction are needed.

Gaseous chlorine dioxide ($ClO_2$) treatments can be an alternative antimicrobial for the elimination of pathogens on fruits and vegetables. $ClO_2$ in both gaseous and aqueous phase is a strong oxidizing and sanitizing agent that has broad and high biocidal effectiveness. It has been reported to effectively inactivate bacteria, including pathogens, virus, bacterial spores, and algae. It has about 2.5 times the oxidation capacity of chlorine. $ClO_2$ maintains its bactericidal activity far longer than chlorine. It is also less reactive than chlorine with organic compounds, and its use is preferred where high organic loads are encountered. Advantages of $ClO_2$ over chlorine also include lack of odor and taste, effectiveness at low concentration, nonconversion to chlorophenols which result in residual smells and flavors, ability to remove chlorophenols already present from other sources, and inability to form harmful chloramines and THMs. Aqueous $ClO_2$ has been approved by FDA for use in washing fruits and vegetables in an amount not to exceed 3 ppm residual $ClO_2$. However, the effectiveness of aqueous $ClO_2$ to decontaminate fruits and vegetables is limited and no more than 2 log reductions have been reported.

An object of the present invention is to provide an apparatus and method of processing produce to reduce microorganisms thereon in a manner that overcomes the disadvantages of traditional processing.

SUMMARY OF THE INVENTION

This invention provides an apparatus and method for processing produce to reduce microorganisms thereon by treating the produce in a treatment chamber with an atmosphere having an effective amount of chlorine dioxide to this end.

An illustrative apparatus embodiment of this invention comprises a produce receiver disposed in a treatment chamber, a means for providing a gas stream comprising chlorine dioxide and a carrier gas into the treatment chamber, a chlorine dioxide sensor in communication with the treatment chamber, and a means for controlling the concentration of chlorine dioxide in the treatment chamber in response to the sensor.

In an illustrative apparatus embodiment of the invention, the treatment chamber an elongated chamber, a drum treatment chamber, a transportation container, or a food storage room.

In another illustrative apparatus embodiment, the produce receiver can be a surface of the treatment chamber, a movable produce receiving surface in the treatment chamber, or a transportation container.

The means for providing a gas stream can comprise a generator having a source of one of chlorine dioxide or chlorine for generating a gas stream comprising of a mixture of chlorine dioxide and a carrier gas. The chlorine dioxide can be gaseous chlorine dioxide or vaporized chlorine dioxide solution in the carrier gas. The generated gas stream flows into the treatment chamber to form the atmosphere inside the treatment chamber for exposing the produce thereto.

The means for controlling the concentration of chlorine dioxide can comprise a feedback control system connected to the chlorine dioxide sensor.

Another embodiment of the invention involves a method for processing the produce that comprises exposing the produce to an atmosphere comprising gaseous chlorine dioxide and a carrier gas in a treatment chamber and can comprise controlling the concentration of chlorine dioxide using the chlorine dioxide sensor, moving the produce in the treatment chamber during exposure to the gaseous chlorine dioxide, spraying water to remove the gaseous chlorine dioxide from the treatment chamber, and purging the treatment chamber to remove any residual chlorine dioxide.

DETAILED DESCRIPTION OF THE INVENTION

The invention is especially useful in processing produce such as fruits and vegetables but is not limited thereto as other kinds of produce such as tubers or other edible plant material can be processed by the present invention for microorganism reduction thereon. In a preferred embodiment, the practice of the invention can achieve at least a 3 log reduction of microorganisms on the produce including but not limited to microorganisms on the exterior surface, cracks, or in other surface irregularities. Microorganisms include any organisms of microscopic or sub-microscopic size. In a more preferred embodiment, a 3 log reduction of pathogenic microorganisms present on the produce is attained. Pathogens can include disease-causing microorganisms such as bacteria, viruses, fungi, or spores, including but not limited to enterotoxigenic *Escherichia coli* O157:H7, *Listeria monocytogenes, Salmonella* spp., *Shigella* spp., *Cyclospora*, and hepatitis A.

Figure 1:
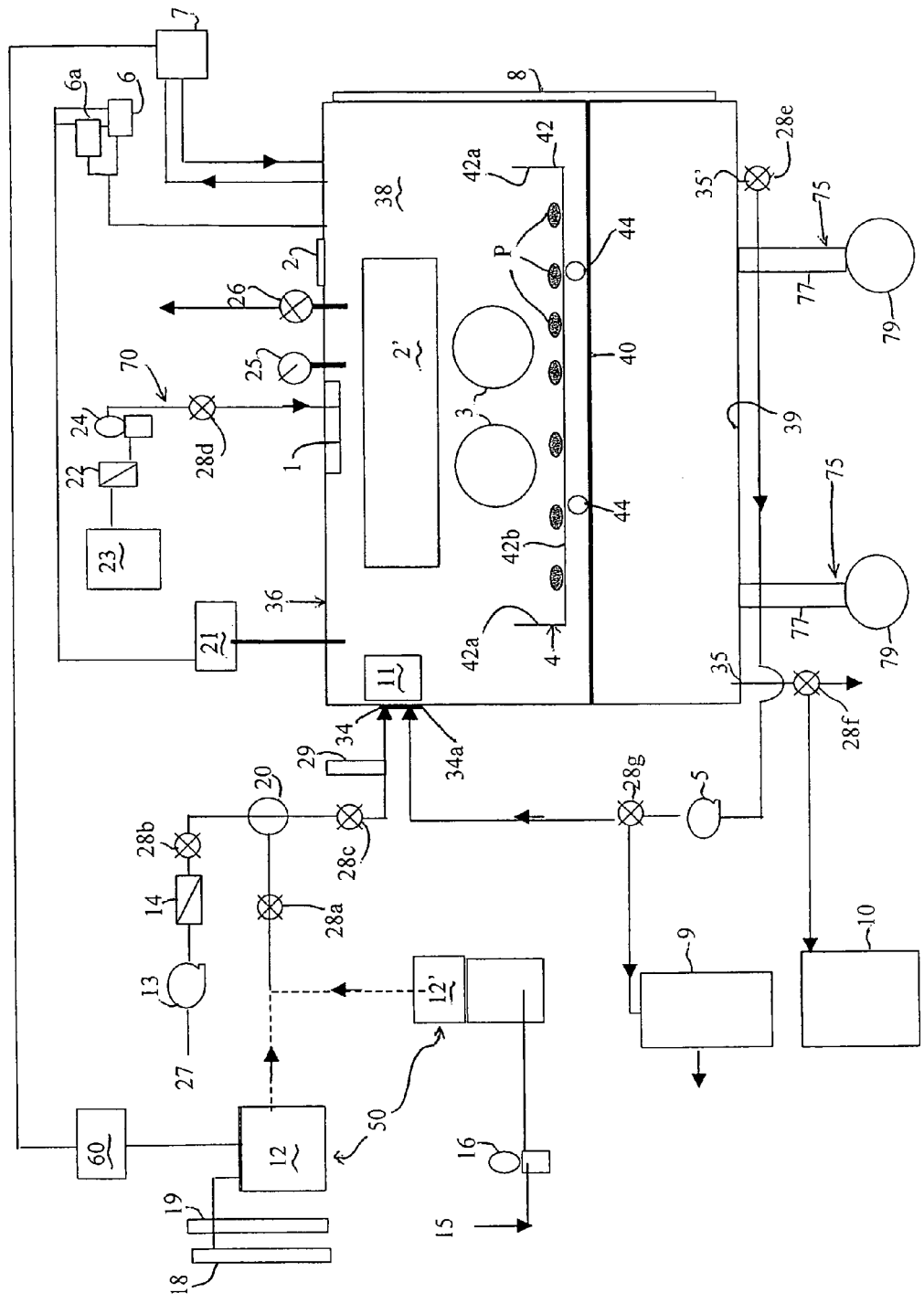
FIG. 1 is a schematic view of the treatment chamber showing the internal features of the treatment chamber.

Referring to FIG. 1, an embodiment of the invention provides an apparatus for exposing produce P to an atmosphere comprising gaseous chlorine dioxide and a carrier gas in a treatment chamber 38. The apparatus comprises a treatment chamber 38, a produce receiver 4 disposed in the treatment chamber 38, a means for providing a gas stream 50 comprising chlorine dioxide and a carrier gas to the treatment chamber 38, a chlorine dioxide sensor 7 in communication with the treatment chamber 38, and a means for controlling the concentration of chlorine dioxide in the treatment chamber 38 in response to information from the chlorine dioxide sensor 7 in a manner to reduce microorganisms thereon.

In an illustrative embodiment of the invention, a vessel or enclosure 36 has a treatment chamber 38 for receiving produce therein and a door 8 for providing access to the treatment chamber 38. One or more windows 2, 2' can be disposed on the vessel 36 for viewing the produce in the treatment chamber 38. Two or more support means 75 are attached to the bottom of the vessel 36 for supporting the vessel 36. Each support means 75 can comprise a leg 77 and a wheel 79 or any other support member that provides stationary or movable support for the vessel 36. A gas inlet 34 is provided to communicate the means for providing a gas stream 50 to the treatment chamber 38. A gas stream circulating device 11 such as a blower, fan can be disposed in the treatment chamber 38 for circulating the gas stream to the treatment chamber 38 and to circulate the atmosphere within the treatment chamber 38. The treatment chamber 38 can include a produce receiver support 40 such as a horizontal support member, shelf, wall or other solid or perforated member sufficient to support the produce receiver 4 thereon. A glove box 3 disposed on the side of the vessel 36 provides access to the chamber 38 for manually moving the produce P or produce receiver 4.

The produce receiver 4 can be a tray 42 constructed of screens with different pore sizes of 0.1-2 cm depending on the size of the produce on the bottom 42a and sidewalls 42b to provide the atmosphere access to the supported surfaces of the produce. The tray 42 can be on wheels 44 and can be moved manually or mechanically to move the produce P in the treatment chamber 38 during processing.

The means for providing a gas stream 50 can comprise commercially available equipment sufficient to generate a gas stream comprising chlorine dioxide and a carrier gas into the treatment chamber 38. FIG. 1 illustrates two exemplary means for providing a gas stream 50 as illustrated by the dashed lines and described below.

In one embodiment the means for providing a gas stream 50 can comprise a generator 12 in communication with a source of chlorine gas 18 such as a chlorine tank and a source of a carrier gas 19 such as air or nitrogen. The generator 12 generates a mixture of gaseous chlorine dioxide and a carrier gas. The generator 12 is commercially available as a chlorine dioxide gas generator such as either a Bench or Pilot scale generator from CDG Technology, Inc. of Bethlehem, Pa. or Model Minidox™ and Cloridox™ generators from ClorDisys Solutions, Inc. of Lebanon, N.J.

In an alternate embodiment, the means for providing a gas stream 50 can comprise a generator 12' that can be a vaporizing tank having a source of chlorine dioxide. The source of chlorine dioxide can be an aqueous solution having a high concentration of chlorine dioxide (0.2-2% in water) prepared using conventional methods or commercially purchased in its stabilized phase such as acidified solution or frozen state. The vaporizing tank is in communication with a source of a carrier gas 15 and a pump 16 for pumping the carrier gas from the source 15 to the vaporizing tank. The source of a carrier gas 15 can be either nitrogen or air. The gas stream is generated in the vaporizing tank/generator 12' by bubbling the carrier gas through the chlorine dioxide solution. The generated gas stream comprises a mixture of vaporized chlorine dioxide solution in the carrier gas.

The gas stream generated from the means for providing a gas stream 50 can either be directly fed into the treatment chamber 38 or diluted by an optional mixing device 20. The flow of the gas stream from the generator 12 or 12' is controlled by a two-way stainless steel ball valve 28a such as a commercially available as Top-Flo® sanitary valve from Top Line Process Equipment Co., Lewis Run, Pa.

If the gas stream is to be diluted, the mixing device 20 is used to mix the gas stream with a diluting gas such as air. The gas mixing device 20 comprises a dilution panel and is commercially available as a manual device from Indiana Oxygen, Inc. (Indianapolis, Ind.) or an automated digital gas mixer (MIX 1000) from Applied Analytics, Inc. (Maynard, Mass.). A pump 13 is in communication with the mixing device 20 and a source of gas 27 to pump the gas to the mixing device 20 for diluting the gas stream. When the gas is air, an air filter 14 can be in communication with the pump 13 and the mixing device 20 to provide filtrated air. A two or three-way valve 28b is in communication with the pump 13 and the mixing device 20 to control flow of the diluting gas to the mixing device 20.

A two-way valve 28c is in communication with either generator 12, 12' or with the mixing device 20 to control the flow of the gas stream mixture to the treatment chamber 38. The valve 28c, flow meter 29, and gas inlet 34 are downstream from the mixing device 20 for controlling and monitoring the flow of the gas stream into the treatment chamber 38.

The gas stream comprising chlorine dioxide and a carrier gas is circulated inside the chamber 38 by the gas stream circulating device 11, such as a fan, blower, or any other suitable device for circulating the gas stream, to provide an atmosphere for exposing the produce thereto. For processing of produce, the concentration of chlorine dioxide in the treatment chamber atmosphere is preferably between about 0.1 to about 20 mg/L, more preferably between about 0.1 to about 10 mg/L, and most preferably between about 1 to about 3 mg/L in the treatment chamber atmosphere but can be in an amount sufficient to achieve the benefits or advantages of this invention as described in the examples listed below. During processing, the gas stream continuously flows into the chamber 38 to maintain a constant concentration of chlorine dioxide in the chamber 38 atmosphere.

To this end, the means for controlling the concentration of chlorine dioxide in the treatment chamber 38 comprises a feedback control system that includes a control computer 60 connected to the chlorine dioxide sensor 7 and the chlorine dioxide generator 12, 12'. The control computer 60 controls the concentration of chlorine dioxide in the treatment chamber 38 in response to a signal from the chlorine dioxide sensor 7 by controlling the generator 12, 12. The chlorine dioxide sensor 7 is in communication with the control computer 60 and the treatment chamber 38 for monitoring the concentration of chlorine dioxide therein. In an illustrative embodiment, the feedback control system can comprise a commercially available Minidox™ or Cloridox™ generator system from ClorDisys Solutions, Inc. that includes an integrated computer control 60 to automatically control the generation of chlorine dioxide gas at the generator 12, 12' and a monitor, such as a chlorine dioxide sensor 7, to monitor the chlorine dioxide gas concentration in the treatment chamber 38. Alternately, the chlorine dioxide sensor 7 can be separate from the computer system 60 and can comprise a continuous chlorine dioxide monitor commercially available as a LD33-DG monitor by Interscan Corp of Chatsworth, Calif.

In a preferred embodiment, the means for controlling the concentration of chlorine dioxide can comprise manually adjustable valve 28c, valve 28a, or mixing device 20 that are adjusted to control the chlorine dioxide concentration. In still another preferred embodiment, the means for controlling the concentration of the chlorine dioxide in the treatment chamber 38 can comprise an adjustable source of chlorine that is adjusted to control the concentration of chlorine dioxide for example using different concentrations of chlorine gas (0.5-4%) for the source of chlorine gas 18.

A pressure gauge 25 and a safety valve 26 are in communication with the treatment chamber 38 for maintaining a preselected maximum pressure preferably less than 50-80 pascals (Pa) in the treatment chamber 38. The produce P is exposed to the treatment atmosphere for an amount of time sufficient to reduce microorganisms thereon, which can be from about 2 minutes to about 7 days. During processing, the atmosphere can also be circulated in the chamber 38 using the gas stream circulating device 11 that can be a motor driven fan. Alternately or in addition, the atmosphere can be circulated into and out of the treatment chamber 38 during processing by outlet 35', ball valve 28e, exterior fan 5, three-way ball valve 28g, and auxiliary inlet 34a.

Figure 2:
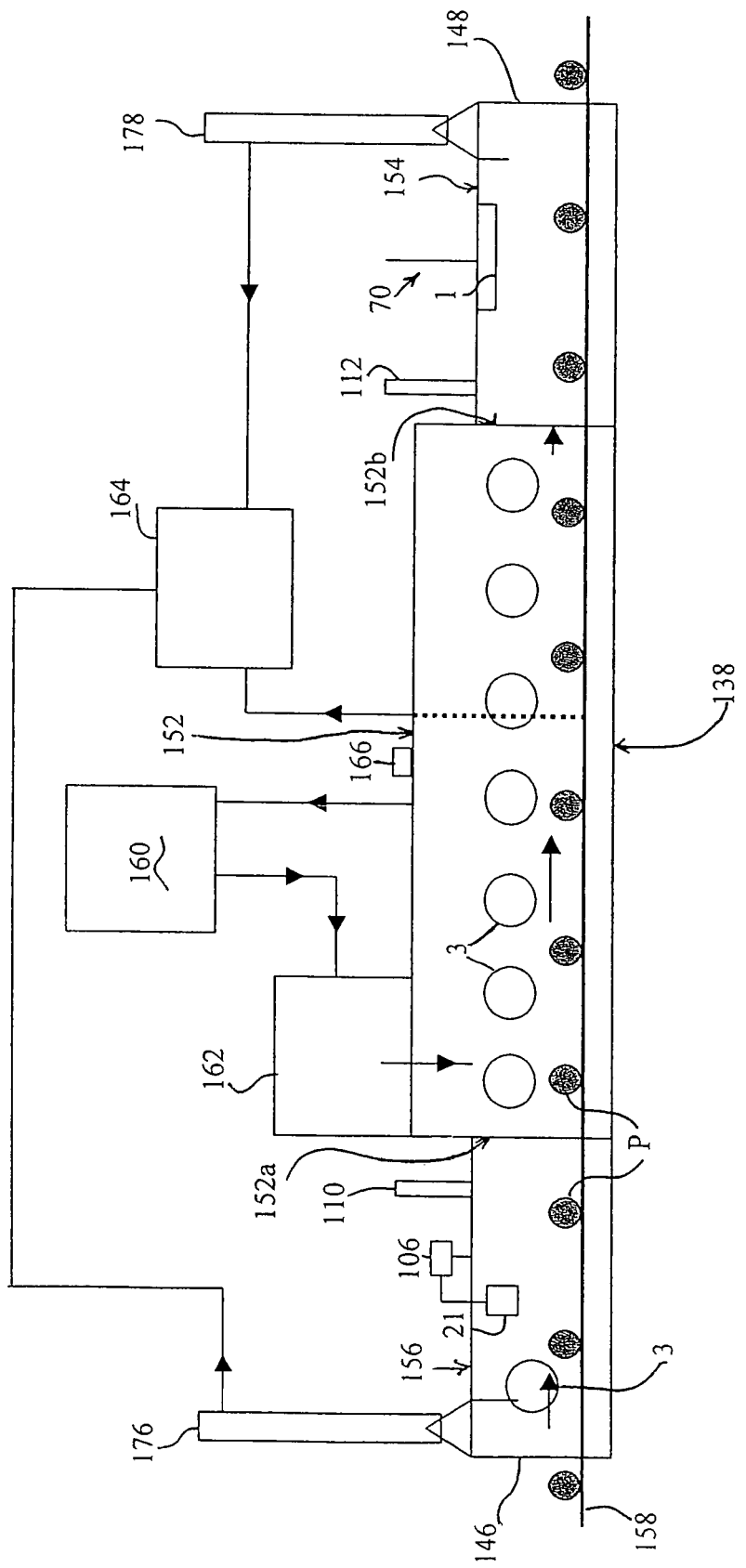
FIG. 2 is a schematic view of the elongated treatment chamber showing the internal humidifying, treatment, and water rinsing regions.

Furthermore, the produce can be moved during processing to improve contact between the treatment atmosphere and the produce. The produce can be moved manually using the glove box 3 or automatically such as by a conveyor as shown in FIG. 2, or the treatment chamber itself can be moved in a manner such that the produce is moved.

A humidifier 21 can be provided for humidifying the atmosphere during processing. During treatment, the atmosphere can have a relative humidity from about 65% to about 100% at a temperature from about 3 to about 25 degrees Celsius, preferably a relative humidity above 80% from about 3 to about 25 degrees Celsius. The humidifier 21 is in communication with the treatment chamber 38 and can maintain a preselected humidity within the treatment chamber when the gas stream is present. A feedback control system can be used to control the relative humidity in the treatment chamber where a computer controls the humidifier 21 in response to a signal from the humidity sensor 6. The humidifier 21 can comprise an ultrasonic humidification system and is commercially available as a model 562 ultrasonic humidifier from by Electro-Tech Systems, Inc. of Glenside, Pa. A humidity sensor 6 and a temperature sensor 6a can be in communication with the treatment chamber 38 for respectively sensing the humidity and temperature of the atmosphere therein. In a preferred embodiment, a thermal hygrometer can be provided to monitor both the humidity and temperature and is commercially available as a Thermo-hygro recorder from Control Company, Friendswood, Tex.

When the microorganisms present on the produce are reduced by the treatment atmosphere, the flow of chlorine dioxide is shut off. Then water is sprayed into the treatment chamber 38 by a water spray device 70 to remove chlorine dioxide on the produce and to dissolve most of the chlorine dioxide gas in the treatment chamber 38. The water spray device 70 comprises a source of potable water 23 such as a commercially available water storage tank, a sterile water filter 22, a water circulating device 24 such as a commercially available water pump, and a two-way sanitary valve 28d disposed outside the vessel 36, and a sprinkler 1 disposed in the treatment chamber 38. The water circulating device 23 pumps water from the source of potable water 23 through the water filter 22 into the sprinkler 1 for spraying the filtrated water into the treatment chamber 38. The sterile water filter 22 has a pore size of 0.2 μm and is commercially available as a Sub-micron filter from Pall Corporation (East Hills, N.Y.) to remove impurities and microorganisms from the water. The valve 28d is used to prevent the leakage of chlorine dioxide gas during treatment and to allow water to flow into the treatment chamber during the spraying of water in the treatment chamber 38.

The sprayed water and the dissolved chlorine form a chlorine dioxide solution in the bottom 39 of the treatment chamber 38. The solution is released from the bottom 39 through outlet 35 and controlled by valve 28f that can comprise any suitable valve for controlling the flow of the chlorine dioxide solution. The solution can be stored in a dissolving tank 10 and used for sanitation of equipment, produce, walls, floors, etc.

After removal of all the chlorine dioxide solution from the treatment chamber 38, the treatment chamber 38 is purged by a purging means to remove residual chlorine dioxide from the treatment chamber 38. The purging means can comprise valve 28c, flow meter 29, inlet 34, chamber 38, outlet 35', fan 5, a three-way ball valve 28g, and a chlorine dioxide neutralizing device 9. That is valve 28a is closed and valves 28c and 28b are opened to allow gas, such as air, to flow from the source of gas 27 into the treatment chamber 38 through the flow meter 29 and inlet 34. The fan 5 draws the purged air from the chamber 38 through outlet 35' and the valve 28g, and then into the chlorine dioxide neutralizing device 9. The chlorine dioxide neutralizer device 9 can be a scrubber that neutralizes the chlorine dioxide by spraying a reducing agent, such as sodium sulfite or sodium thiosulfate from Sigma- Aldrich (St. Louis, Mo.), and is commercially available from CDG Technology, Inc. The residue of chlorine dioxide in the air released from the chlorine dioxide neutralizing device is lower than 0.1 ppm by volume. The purge process may take 5-10 min. When the chlorine dioxide gas concentration in the treatment chamber 38 is reduced to less than 0.1 ppm by volume, the chamber 38 is safe to open and the treated produce can be removed.

The following examples are offered in order to more fully illustrate the invention but are not to be construed as limiting the scope thereof. The concentration of gaseous $ClO_2$ can be measured as mg/L or ppm, where 1 mg/L $ClO_2$ is equivalent to approximately 332 ppm in volume under standard conditions (0° C., 1 atm pressure) and 362 ppm in volume under normal conditions (25° C., 1 atm pressure). Different pathogenic bacteria were selected as targets in the examples below, including *Escherichia coli* O157:H7, *Listeria monocytogenes*, *Salmonella* spp., and *Shigella* spp. These pathogenic microorganisms were spot-inoculated on the selected surfaces and treated.

Example 1

Decontamination of Strawberries

Concerns have been raised about the microbial safety of strawberries because strawberries have been associated with three major outbreaks of hepatitis A, a virus spread by human feces, and a protozoan, *Cyclospora cayetanensis*. The source of contamination was thought to be from infected harvesters or contaminated irrigation water. It has been reported that foodborne pathogens, such as *E. coli* O157:H7 and *Salmonella* spp., can survive but not grow on the surface of fresh strawberries throughout the expected shelf life of the fruit and even survive in frozen strawberries for periods of greater than 1 month.

A cocktail mixture of *E. coli* O157:H7 strains (C7927, EDL933, 204P) and a mixture of *L. monocytogenes* strains (Scott A, F5069, LCDC 81-861) were utilized as target pathogens. Strawberries were spot-inoculated with 7-8 log cfu/strawberry of each pathogen (0.1 ml culture), stored for 1 day and 7 days at 4° C. Bacterial populations on the samples after inoculation and after 1-day and 7-day storage were recovered and enumerated, respectively.

Each inoculated strawberry was mixed with 100 ml phosphate buffer saline (PBS, pH 7.2), washed for 15 min on an electronic shaker at 210 rpm at 22° C. Then bacterial populations in washing fluid were examined using a direct surface-plating (SP) method with a selective medium or a membrane-transferring-plating (MTP) method with tryptic soy agar and sorbital MacConkey agar (*E. coli* O157:H7) or modified oxford agar (*L. monocytogenes*) (Han et al., "Effects of recovery, plating, and inoculation methods on quantification of *Escherichia coli* O157:H7 and *Listeria monocytogenes* from strawberries," J. Food Protection, 2004, 67: 2436-2442), respectively. Typical colonies were confirmed by agglutination Latex test available from Oxoid, Ogdensburg, N.Y. for *E. coli* O157:H7 and API *Listeria* strips for *L. monocytogenes* available from BioMerieux Vitec, Hazelwood, Mo.

$ClO_2$ gas was generated from a CDG generator using 4% chlorine gas. A $ClO_2$ gas treatment apparatus, similar to FIG. 1, was used which included a 10 L Irvine Plexiglass cylinder, a Thermo-Hygro recorder, and a diaphragm vacuum pump. The concentration of $ClO_2$ was measured using a DPD colorimetric analysis kit (CHEMetrics, Inc.). The inoculated and 1-day stored strawberries were treated with 0.2-4 mg/L $ClO_2$ gas for 15 or 30 min at 22° C. and 90-95% relative humidity. After treatment, each sample was washed with 100 ml neutralizing buffer for 15 min. Bacterial populations in washing fluids were enumerated using the MTP method. To enumerate low bacterial level (<2 log cfu/ml) in the washing fluid, bacteria were concentrated by filtration of a volume of 1, 10, or 50 ml fluid through a polycarbonate membrane using a Sterifil Aspetic System (Millipore Inc., Bedford, Mass., USA). After filtration the membrane was transferred onto TSA plates, followed by the same resuscitation and enumeration procedure for MTP method.

After 1-day storage at 4° C., inoculated strawberries were treated with 0.2-4 mg/L $ClO_2$ gas for 15 or 30 min at 22° C. and 90-95% relative humidity (Tables 2 and 3). The treatments of 0.2 mg/L or 0.6 mg/L for 15 min achieved only 1.2-1.9 log reductions of *E. coli* O157:H7 and 1.8-2.6 log reduction of *L. monocytogenes* (Table 1). When treatment time increased from 15 to 30 min, log reductions of both bacteria were increased by approximately 1 log ($P<0.05$). More cells of *L. monocytogenes* (Table 1) were inactivated by 0.2 or 0.6 mg/L $ClO_2$ gas for 15 min than *E. coli* O157:H7 ($P<0.05$). This observation may be due to a higher number of injured *L. monocytogenes* on strawberry surfaces before $ClO_2$ gas treatment.

For 30 min treatment time, increasing $ClO_2$ gas concentration from 0.2 mg/L to 3 mg/ml (Table 2) led to an increase of log reduction for *E. coli* O157:H7 and *L. monocytogenes* from 2.4 to 4.6 and from 2.8 to 4.5, respectively. The differences between log reductions of these two bacteria after 0.2, 0.6, 1.2, 1.8, 2.4, or 3 mg/L were not significantly different ($P>0.05$). After 4 mg/L $ClO_2$ gas treatment 30 min, 5.1 log *E. coli* O157:H7 were inactivated and no surviving *L. monocytogenes* were detected using the MTP method. Therefore, $ClO_2$ gas treatment is a promising disinfection technique for reducing *E. coli* O157:H7 and *L. monocytogenes* on strawberries.

TABLE 2

Inactivation of *E. coli* O157:H7 and *L. monocytogenes* on strawberries by 0.2 or 0.6 mg/L $ClO_2$ gas treatments for 15 and 30 min at 22° C. and 90-95% relative humidity

| Organisms[1] | Population before $ClO_2$ gas treatment | | Log reduction after 0.2 mg/L $ClO_2$ gas treatment | | Log reduction after 0.6 mg/L $ClO_2$ gas treatment | |
|---|---|---|---|---|---|---|
| | SP | MTP | 15 min | 30 min | 15 min | 30 min |
| *E. coli* O157:H7 | 6.9 ± 0.2a[2] | 7.5 ± 0.1a | 1.2 ± 0.1b | 2.4 ± 0.2a | 1.9 ± 0.1b | 3.0 ± 0.5a |
| *L. monocytogenes* | 3.7 ± 0.3b | 5.4 ± 0.2b | 1.8 ± 0.2a | 2.8 ± 0.3a | 2.6 ± 0.5a | 3.6 ± 0.2a |

[1] Spot inoculation level: 8.25 log cfu *L. monocytogenes* and 8.19 log cfu *E. coli* O157:H7. After inoculation, samples were stored for 24 hr at 4° C.
[2] Values in the same column with different lowercase letters are significantly different ($p < 0.05$).

TABLE 3

Inactivation of *E. coli* O157:H7 and *L. monocytogenes* on strawberries by 0.2-4 mg/L $ClO_2$ gas treatments for 30 min at 22° C. and 90-95% relative humidity

| $ClO_2$ gas concentrations (mg/L) | Log reduction of *E. coli* O157:H7 (log cfu) | Log reduction of *L. monocytogenes* (log cfu) |
|---|---|---|
| 0.2 | 2.4 ± 0.2 | 2.6 ± 0.3 |
| 0.6 | 3.0 ± 0.5 | 3.6 ± 0.2 |
| 1.2 | 3.5 ± 0.1 | 3.9 ± 0.4 |
| 1.8 | 4.2 ± 0.2 | 4.5 ± 0.7 |
| 2.4 | 4.5 ± 0.5 | 4.4 ± 0.5 |
| 3 | 4.6 ± 0.2 | 4.8 ± 0.7 |
| 4 | 5.1 ± 1.0 | >5.4 ± 0.1 |

Example 2

Decontamination of Cantaloupes

Salmonellosis is one of the most common forms of foodborne illness. In recent years, there have been three multistate outbreaks of Salmonelleosis caused by contaminated cantaloupes, all of which involved consumption from either salad bars or fruit salads. Cantaloupes can become tainted at any time during growth, harvest, distribution, processing, and handling due to frequent exposure to soil, insects, humans, or other contaminated products. The rough texture and hydrophobic nature of the surfaces of cantaloupes enable bacteria to readily attach and can be difficult to remove. Although *Salmonella* cannot readily multiply on the outer surfaces of cantaloupes, the cells can be transferred to the flesh during slicing, making precut slices of fruit vulnerable to *Salmonella* growth. This may account for outbreaks of foodborne illness from salad bars or fruit salads that contain cantaloupes.

A cocktail mixture of 5 *Salmonella* strains (*S. enteritidis, S. typhi, S. anatum, S. choleraesuis,* and *S. poona*) were used as the target pathogens. Each cantaloupe was spot-inoculated with 0.1 ml (7-8 log cfu) culture at three different sites (2.5× 2.5 cm$^2$): the stem, the air exposed skin (which was green and had a rougher texture), and the soil exposed skin (which was white and had a smoother texture). Inoculated samples were dried in a biosafety hood for 30 minutes and stored at 4° C. for 24 hrs prior to water rinse or $ClO_2$ gas treatment.

A continuous $ClO_2$ gas treatment system, similar to FIG. 1, was used to treat inoculated cantaloupes. $ClO_2$ gas was produced with a CDG Technology generator using 4% chlorine gas. The concentration of $ClO_2$ was measured using an Interscan continuous $ClO_2$ monitor. The inoculated cantaloupes were treated with concentrations of 200-2000 ppm by volume for 5-15 min at 21° C. and 60% relative humidity.

Each inoculated site was cut from the cantaloupe and mixed with 100 ml of peptone solution in a stomacher bag, then stomached for 4 min at 260 rpm. The stomachates were serially diluted or concentrated by filtration, and enumerated using surface plating on bismuth sulphite (BS) and xylose lysine desoxycholate (XLD) agars. All plates were incubated at 37° C. for 24 hours.

A Hunter colorimeter was used to determine color changes on air exposed skin and soil exposed skin of cantaloupes after 2000 ppm $ClO_2$ gas treatment for 10 min.

Rinsing the cantaloupes with water caused a log reduction 1.4±0.5 on the soil exposed skin and 0.6±0.4 on the air exposed skin. Studies using scanning electric microscopy suggested that many of the cells on the smooth surfaces had been removed by water rinse, while a greater number of cells that had been lodged in the stomata or the rough-textured areas remained on the cantaloupes.

Figure 5:
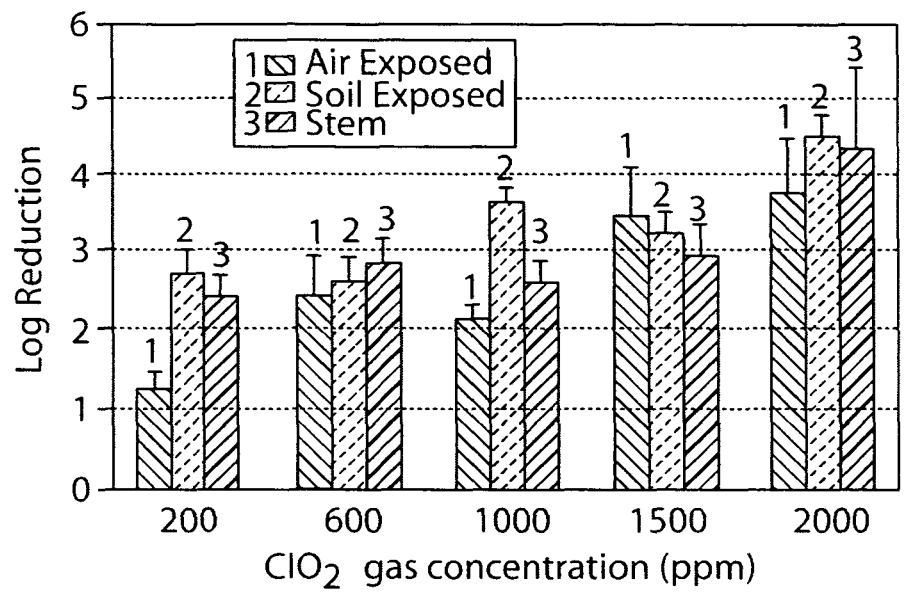
FIG. 5 is a graph showing the log reductions of *Salmonella* spp. on the surfaces of cantaloupes after exposure to various concentrations of $ClO_2$ gas for 10 minutes.
Figure 6:
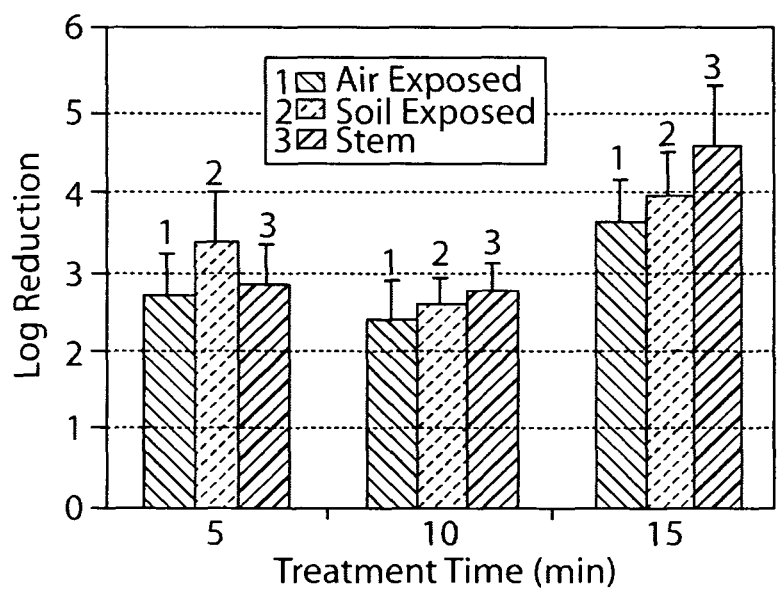
FIG. 6 is a graph showing the log reductions of *Salmonella* spp. on the surfaces of cantaloupes after exposure to 600 ppm of $ClO_2$ gas for 5, 10, and 15 minutes.

A general increase in log reduction was observed as $ClO_2$ gas concentration increases (FIG. 5). No significant difference (P>0.05) in log reductions among three surfaces was observed after 1500 and 2000 ppm treatments for 10 min, however, significant difference (p<0.05) was seen at 200 ppm, where the air exposed site had the least log reduction. At 600 ppm $ClO_2$ gas concentration (FIG. 6), bacterial log reductions between 5 min and 10 min treatments were not significantly different (P>0.05), while 15 min treatment showed a higher log reduction for all of the air exposed skin, soil exposed skin, and stem. Therefore, exposure to higher concentrations of $ClO_2$ gas for greater amounts of time led to higher log reductions, with the highest reductions being 4.5±0.5 at 2000 ppm for 10 minutes on the soil exposed skin (FIG. 6), and 4.6±1.0 at 600 ppm for 15 minutes on the air exposed skin (FIG. 6). Note that ppm is by volume. Although 5 log reductions were not achieved under the test conditions, results indicate that $ClO_2$ gas treatment could be an effective method of decontamination at higher doses.

The L, a, and b hunter color values of the air exposed skin and soil exposed skin of the cantaloupes did not change significantly (P>0.05) after treatment with 2000 ppm of $ClO_2$ gas for 10 min. Since this high treatment did not adversely affect the visual quality of the cantaloupes, it may be possible to treat cantaloupes with higher dose of $ClO_2$ gas to achieve greater log reductions without affecting the appearance.

Example 3

Decontamination of Mushroom

Fresh uncut mushrooms were washed in tap water and allowed to air dry prior to inoculation with a cocktail containing five *Salmonella* strains (*S. enteritidis, S. Poona, S. choleraesius, S. typhi,* and *S. anatum*). Mushroom samples were spot inoculated with 0.1 ml of mixed 18-24 hr culture at two different locations (top of the cap and the underside of the cap). After the spot inoculation areas were allowed to dry. Mushrooms were then treated in an apparatus similar to FIG. 1 using a 10 L Irvine Plexiglass cylinder as the chamber and a stainless steel shelf therein as the produce receiver, where two inoculated mushrooms were laid on their side in the chamber. A wireless Thermo-Hygro recorder (RadioShack Corporation, Fort Worth, Tex.) was used to monitor relative humidity and temperature inside the treatment chamber. Gaseous $ClO_2$ was produced using 0.5% chlorine gas in nitrogen using a laboratory chlorine dioxide generator (CDG Technology, Philadelphia, Pa.). Once chlorine dioxide gas was generated, $ClO_2$ flowed through a stainless steel dilution panel where the gas was diluted with sterile air. From the dilution panel, $ClO_2$ gas was injected into the 10 L Irvine Plexiglass cylinder where the gas was circulated inside the chamber using a 4.5 inch fan. Before injecting diluted $ClO_2$ gas inside the chamber, approximately 90% relative humidity was achieved using an ultrasonic humidification system (Electro-Tech Systems, Inc., Glenside, Pa.). Once the chamber reached 90% relative humidity, $ClO_2$ was injected inside the chamber and maintained at the specific concentration for the required contact time. At the end of the treatment, the chamber was exhausted for 5 min by vacuum and the gas was neutralized after flowing through 2.0% sodium thiosulfate in a flask. After treatment each mushroom was removed from the cylinder and placed into a filter stomacher bag containing 50 ml of neutralizing buffer. Samples were then stomached for 2 min at 260 rpm. Samples were then diluted with 0.1% peptone, plated on tryptic soy agar with polycarbonate membrane, and incubated for 4 hrs at 37° C. Then the polycarbonate membranes were transferred onto selective medium XLD agar. Plates were then incubated for an additional 18 hrs prior to counting.

Treating fresh uncut mushrooms with relatively low concentrations of gaseous $ClO_2$ is an effective technology for reducing microbial contamination. Table 4 shows microbial reduction after different chlorine dioxide gas treatments.

TABLE 4

Reducing *Salmonella* spp. on fresh uncut mushrooms using chlorine dioxide gas treatments

| Treatment | Site | Log Reduction (cfu/ml) |
|---|---|---|
| 6 ppm for 3 min | Top | 0.08 |
| | Bottom | 0.21 |
| 6 ppm for 17 min | Top | 1.37 |
| | Bottom | 0.91 |
| 100 ppm for 15 min | Top | 2.69 |
| | Bottom | 1.30 |
| 150 ppm for 5 min | Top | 3.12 |
| | Bottom | 0.44 |
| 150 ppm for 15 min | Top | 3.90 |
| | Bottom | 1.33 |
| 500 ppm for 10 min | Top | 2.58 |
| | Bottom | 3.84 |
| 850 ppm for 5 min | Top | 4.46 |
| | Bottom | 3.39 |
| 850 ppm for 10 min | Top | 3.95 |
| | Bottom | 5.51 |
| 994 ppm for 3 min | Top | 6.60 |
| | Bottom | 3.06 |
| 994 ppm for 17 min | Top | 4.70 |
| | Bottom | 4.95 |
| 1000 ppm for 15 min | Top | 4.53 |
| | Bottom | 4.45 |

Example 4

Decontamination of Oranges

Organic oranges were washed in tap water and allowed to air dry prior to inoculation with a cocktail containing five *Salmonella* strains (*S. enteritidis*, *S. poona*, *S. choleraesius*, *S. typhi*, and *S. anatum*). Orange samples were spot inoculated with 0.1 ml of mixed 18-24 hr culture at three different 1 in² locations (stem cavity, side and bottom). After the spot inoculation areas were allowed to dry. Oranges were then treated with chlorine dioxide gas in the same way as the mushroom samples were treated in the 10 L Irvine Plexiglass cylinder. Log reductions of *Salmonella* spp. on three inoculation sites after chlorine dioxide treatments are shown in Table 5.

TABLE 5

Reducing *Salmonella* spp. on oranges using chlorine dioxide gas treatments

| Treatment | Site | Log Reduction (cfu/ml) |
|---|---|---|
| 30 ppm for 7 min | Side | 2.19 |
| | Stem | 3.37 |
| | Bottom | 4.53 |
| 50 ppm for 2 min | Side | 2.00 |
| | Stem | 1.94 |
| | Bottom | 1.75 |
| 50 ppm for 12 min | Side | 1.79 |
| | Stem | 2.20 |
| | Bottom | 1.95 |

TABLE 5-continued

Reducing *Salmonella* spp. on oranges using chlorine dioxide gas treatments

| Treatment | Site | Log Reduction (cfu/ml) |
|---|---|---|
| 100 ppm for 1 min | Side | 1.80 |
| | Stem | 2.31 |
| | Bottom | 2.29 |
| 100 ppm for 7 min | Side | 6.14 ± 0.07 |
| | Stem | 4.77 ± 0.20 |
| | Bottom | 5.72 ± 0.32 |
| 100 ppm for 14 min | Side | 5.95 |
| | Stem | 5.67 |
| | Bottom | 5.93 |
| 150 ppm for 2 min | Side | 5.09 |
| | Stem | 5.37 |
| | Bottom | 4.03 |
| 150 ppm for 2 min | Side | 6.07 |
| | Stem | 6.12 |
| | Bottom | 6.52 |
| 170 ppm for 7 min | Side | 6.26 |
| | Stem | 6.37 |
| | Bottom | 6.23 |

Figure 3:
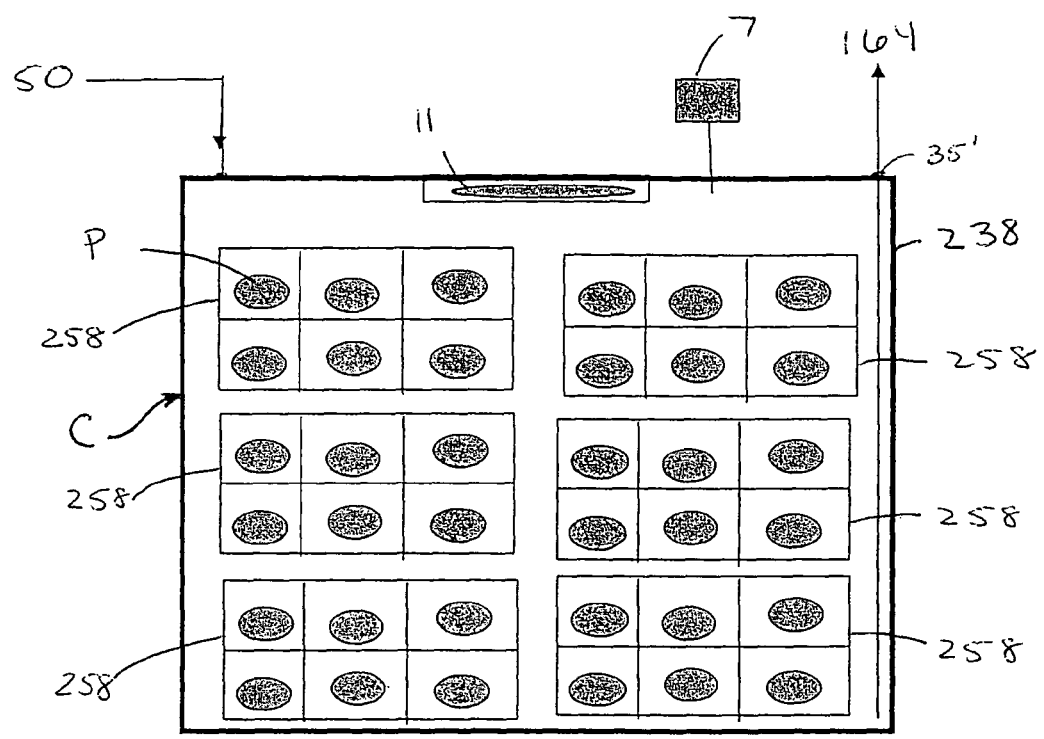
FIG. 3 is a schematic view showing a transportation container or a storage room as the treatment chamber.

While the embodiments and examples listed above are generally applicable for small scale commercial operations, the embodiments shown in FIGS. 2 and 3 are offered for use in large scale commercial processing.

FIG. 2, where like features of FIG. 1 have the same reference number as FIG. 1, shows another embodiment of the invention where the treatment chamber 138 is an elongated chamber. The treatment chamber 138 has a produce inlet 146 and a produce outlet 148 for processing produce P. The treatment chamber 138 includes at least one treatment region 152, where the produce is exposed to an atmosphere comprising chlorine dioxide and a carrier gas; a humidifying region 156 upstream from the treatment region, where the ambient air is humidified; and can optionally include at least one water rinsing region 154 downstream from the treatment region 152, where the treated produce are sprayed with water. In another embodiment, the apparatus does not include a water rinsing region 154 so that the produce P can be air-dried after treatment.

The produce is moved through the regions 156, 152, 154 on a produce receiver 158, which can comprise a movable produce receiving surface in the treatment chamber 138. The movable surface of the produce receiver 158 moves from the produce inlet 146 to the produce outlet 148 during processing. The produce receiver 158 can move at a controlled rate to expose the produce to the atmosphere for an amount of time sufficient to reduce microorganisms on the produce. The produce receiver 158 can be a conveyor, an apertured conveyor, or any other suitable device sufficient to move the produce through the treatment chamber 138. The produce receiver 158 can move in a continuous or an interrupted movement through the regions 156, 152, 154 for exposing the produce to an atmosphere for an amount of time sufficient to reduce microorganisms thereon.

The humidifying region 156 of the treatment chamber 138 can comprise a humidifier 21 and air inlet 110 for prehumidifying the produce P. The humidity in the air of the humidifying region 156 puts a film of moisture on the produce P to prehumidify the produce for treatment. The air in the treatment region 152 is then humidified by the prehumidified produce P. The humidifier 21 humidifies the ambient air to a desired level and can comprise a large scale ultrasonic humidifier or a steam injector. A thermal hygrometer 106 can be provided to monitor the relative humidity and temperature of the air in the humidifying region 156. In an illustrative embodiment, a humidification feedback control system can be provided and can comprise a computer in communication with both the humidifier 21 and the thermal hygrometer 106 where the computer controls the relative humidity in the humidifying region 156 in response to a signal from the thermal hygrometer 106. An air inlet 110 provides a passage for air to flow into the prehumidifying region 156 to form an air curtain proximate the treatment inlet 152a that can be used to separate the atmospheres of humidifying region 156 and the treatment region 152. Multiple glove boxes 3 can also be provided to allow access to the humidifying region 156.

The treatment region 152 comprises a chlorine dioxide generator, monitor, and controller 160; chlorine dioxide gas reservoir 162; and an exhausting and neutralizing device 164. The chlorine dioxide generator, monitor, and controller 160 generates the gas stream comprising chlorine dioxide and a carrier gas, monitors the chlorine dioxide concentration of the atmosphere in the treatment region 152, and controls the chlorine dioxide concentration of the atmosphere in the treatment region 152. The chlorine dioxide generator, monitor, and controller 160 can be an automated chlorine dioxide generator/monitor and is commercially available as Mindox-M automated $ClO_2$ gas generator/monitor unit from ClorDisys Solutions, Inc. or a pilot chlorine dioxide gas generator form CDG Technology, Inc. The chlorine dioxide gas reservoir 162 is in communication with the chlorine dioxide generator, monitor, and controller 160 and the treatment region 152 and provides storage for generated chlorine dioxide at concentrations of 0.1-20 mg/L. The chlorine dioxide gas reservoir 162 can store large amounts of chlorine dioxide gas at a constant gas concentration, which can be controlled and monitored by the chlorine dioxide generator 160. The chlorine dioxide gas can be circulated from the reservoir 162 to the treatment region 152 during treatment. During processing the gas stream is circulated into the treatment region 152 and circulated therein to form the atmosphere for processing. The concentration of $ClO_2$ gas in the treatment region atmosphere is maintained by air curtains proximate the treatment inlet 152a and treatment outlet 152b. The air curtains are formed by air discharged from air inlets 110, 112 and can have a positive pressure that is slightly higher than the pressure in the treatment region 152 so that the $ClO_2$ gas will not escape the treatment region 152. The treatment region 152 can have a pressure relief valve 166 to release the pressure therein if the pressure in the treatment chamber 152 is higher than a maximum pressure. For purposes of illustration only and not limitation, the pressure in the treatment region during treatment can be from about 5 to about 20 Pa above the atmosphere pressure (1 atm=101325 Pa) and the pressure at the treatment inlet 152a and outlet 152b can be from about 25 to about 60 Pa above atmosphere pressure. To remove the atmosphere from the treatment region 152, the atmosphere is circulated through an exhausting and neutralizing device 164 which can comprise a neutralizing tank with a reducing agent solution.

After exposure to the atmosphere comprising chlorine dioxide and a carrier gas in the treatment region 152, the treated produce can be rinsed in the water rinsing region 154. A water spray device 70 and the air inlet 112 are in communication with the water rinsing region 152. The water spray device 70 having a sprinkler 1 sprays filtrated water into the rinsing region 154 to reduce the residual chlorine dioxide on the produce. The air inlet 112 provides a passage for air to flow into the water rinsing region 154 to form an air curtain that can be used to separate the atmosphere of the humidifying region 156 and the treatment region 152. The water and chlorine dioxide form a solution that can be reutilized to wash incoming produce before undergoing treatment.

Alternately, the treated produce can be air-dried without water rinsing, followed by direct packaging.

An inlet exhaust hood 176 proximate the produce inlet 146 and an outlet exhaust hood 178 proximate the produce outlet 148 can be used for emergency evacuation of $ClO_2$ gas from the treatment chamber 138, which can then be neutralized in the exhausting and neutralizing device 164.

Another embodiment of the invention envisions a transportation container C, shown in FIG. 3 where like features of FIGS. 1 and 2 have the same reference number as FIGS. 1 and 2, or a storage room as the treatment chamber 238 for exposing the produce P to the atmosphere while moving, transporting, or storing the produce. The transportation container C can comprise a standard food storage container of the type used by rail, truck or ship. A plurality of produce receivers 258, as shown in FIG. 3, can be disposed in the transportation container. The produce receivers 258 themselves can also comprise smaller transportation containers within the larger transportation container C. For purpose of illustration only and not limitation the smaller transportation container can be any conventional transportation container used for produce such as a bushel container of apples or a 138 ct box of oranges. Although FIG. 3 shows a plurality of produce receivers 258 this invention also envisions using a surface of the transportation container C itself as the produce receiver.

The produce can be processed during transportation or storage. For example, the treatment chamber 238 can be moving from one location to another while exposing the produce to the chlorine dioxide atmosphere supplied from the means for providing a gas stream 50 as shown in detail in FIG. 1 and monitoring by the chlorine dioxide sensor 7. The gas stream can be circulated in the treatment chamber 238 by the gas stream circulating device 11 such as a motor driven fan. An exhausting and neutralizing device 164 such as that shown in FIG. 2 can comprise a neutralizing tank with a reducing agent solution. This embodiment can be used for decontamination of produce to reduce the microorganisms thereon. Furthermore, it can be especially designed as a response treatment for fresh products, such as imported produce, which may be contaminated by bioterrorists.

Figure 4:
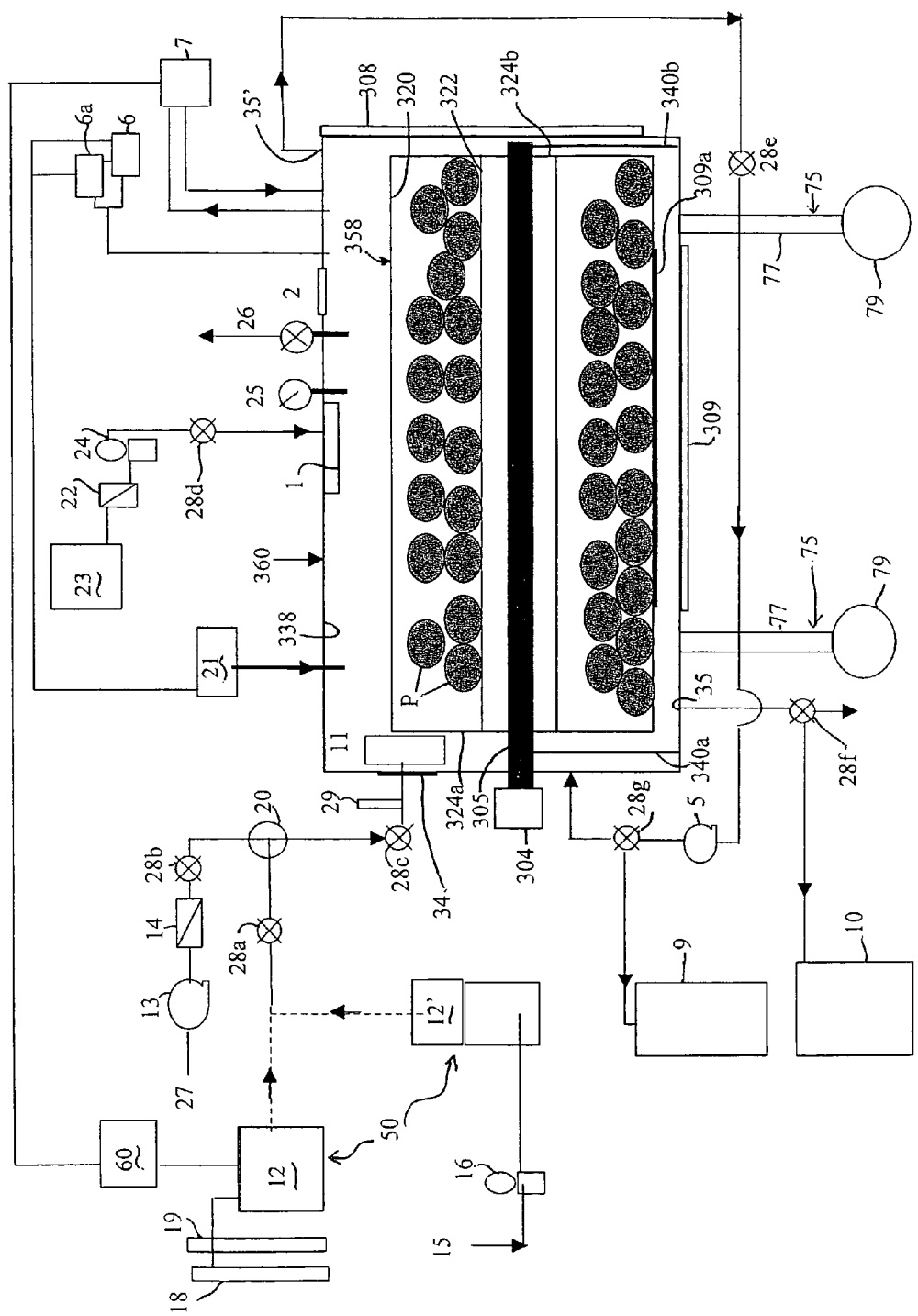
FIG. 4 is a schematic view of a drum treatment chamber showing the internal features of the drum treatment chamber.

Still a further embodiment of the invention suitable for small scale processing involving a drum treatment chamber 338 is shown in FIG. 4, where like features of FIG. 1 have the same reference numerals as in FIG. 1. The drum treatment chamber 338 can comprise a cylindrical chamber within a vessel or enclosure 360 that can also be cylindrical or any other suitable shape. The drum chamber embodiment moves the produce by rotating a produce receiver 358, which causes the produce to tumble therein, inside the stationary treatment chamber 338 and can be used for treating produce with invulnerable skin such as oranges, green beans, potatoes, onions, and garlic. The produce receiver 358 has an annular space for receiving produce and is defined between an outer wall 320, an inner wall 322, and end walls 324a, 324b. The outer wall 320 can be perforated. A motor 304 rotates an axle 305 connected to the inner wall 322 thereby causing the produce receiver 358 to rotate within the treatment chamber 338. The motor 304 and axle 305 can be any suitable commercially available devices capable of rotating the produce receiver 358 in the treatment chamber 338. The axle 305 is supported in the treatment chamber by axle supports 340a, 340b.

The end door 308 at the end of the vessel 360 provides access to the treatment chamber 338 for repairing and installation of components in the treatment chamber 338. The side door 309 disposed on the side of the vessel 360 and the interior door 309a disposed on the outer wall 320 of the produce receiver 358 provide openings for the addition and removal of produce P.

It is to be understood that the invention has been described with respect to certain specific embodiments thereof for purposes of illustration and not limitation. The present invention envisions that modifications, changes, and the like can be made therein without departing from the spirit and scope of the invention as set forth in the following claims.

We claim:

1. A method for processing fruit and/or vegetable produce, comprising humidifying ambient air in a humidifying region upstream and proximate to an inlet of a treatment chamber to form moisture on the produce that is carried through the inlet into a treatment region of the treatment chamber, exposing said produce to an atmosphere comprising gaseous chlorine dioxide and a carrier gas selected from the group consisting of air and nitrogen in the treatment region of the treatment chamber, sensing gaseous chlorine dioxide in the atmosphere in the treatment region, and controlling the concentration of gaseous chlorine dioxide in the atmosphere in the treatment region in response to said sensing in a manner to reduce pathogens on said produce.

2. The method of claim 1 further comprising moving said produce on a produce receiver that moves through the inlet and through said treatment chamber.

3. The method of claim 2 further comprising moving the produce receiver comprising a conveyor through the inlet and through said treatment chamber in a manner that the produce is moved through the inlet and the treatment chamber.

4. The method of claim 1 further comprising spraying water in a water-rinsing region of said treatment chamber to remove the chlorine dioxide from the produce.

5. The method of claim 1 wherein said atmosphere in said treatment region has a chlorine dioxide concentration between about 0.1 to about 20 mg/L.

6. The method of claim 1 wherein said atmosphere in said treatment region has a chlorine dioxide concentration between about 0.1 to about 10 mg/L.

7. The method of claim 1 wherein said atmosphere in said treatment region has a chlorine dioxide concentration between about 1 to 3 mg/L.

8. The method of claim 1 wherein said atmosphere in said treatment region is humidified by said moisture on said produce to have a relative humidity from about 65 to about 100% at a temperature from about 3 to about 25 degrees Celsius.

9. The method of claim 8 wherein said atmosphere in said treatment region has a relative humidity above 80% at a temperature from about 3 to about 25 degrees Celsius.

10. The method of claim 1 further including exposing the produce to said atmosphere in the treatment region for a time in the range of about 2 minutes to about 7 days.

11. The method of claim 1 further including moving a produce receiver in said treatment chamber while exposing the produce to said atmosphere comprising said gaseous chlorine dioxide and said carrier gas.

12. The method of claim 1 wherein said exposure is effective to attain at least a 3 log reduction in a pathogen.

13. The method of claim 1 wherein said atmosphere consists of said gaseous chlorine dioxide and said carrier gas.

* * * * *